United States Patent [19]

Geist et al.

[11] Patent Number: 4,609,691

[45] Date of Patent: Sep. 2, 1986

[54] WATER-DISPERSIBLE BINDERS FOR CATIONIC ELECTRODEPOSITABLE PAINTS, AND METHOD FOR THEIR PRODUCTION

[75] Inventors: Michael Geist, Munster; Gunther Ott, Munster-Wolbeck; Georg Schon, Everswinkel, all of Fed. Rep. of Germany

[73] Assignee: BASF Farben & Fasern AG, Hamburg, Fed. Rep. of Germany

[21] Appl. No.: 646,244

[22] Filed: Aug. 31, 1984

[30] Foreign Application Priority Data

Sep. 3, 1983 [DE] Fed. Rep. of Germany ....... 3331903

[51] Int. Cl.$^4$ ...................... C08G 59/14; C08L 63/00; C25D 13/00; C09D 5/44
[52] U.S. Cl. .................................... 523/415; 523/414; 523/416; 525/407; 525/410; 525/415; 528/99; 528/100; 528/104; 528/110
[58] Field of Search ................. 528/99, 100, 104, 110; 525/407, 410, 415; 523/414, 415, 416

[56] References Cited

U.S. PATENT DOCUMENTS

| | | | |
|---|---|---|---|
| 3,316,277 | 4/1967 | Frank et al. | 528/100 X |
| 4,148,772 | 4/1979 | Marchetti et al. | 523/414 X |
| 4,331,782 | 5/1982 | Linden | 528/100 X |
| 4,339,369 | 7/1982 | Hicks et al. | 523/414 |
| 4,419,467 | 12/1983 | Wismer et al. | 523/414 |

*Primary Examiner*—Earl Nielsen
*Attorney, Agent, or Firm*—Kenyon & Kenyon

[57] ABSTRACT

The invention relates to water-dispersible binders for cationic electro-dip paints with a base of modified epoxy resins. The binders are produced by reaction of (A) epoxy resins having a molecular weight of at least 350 with
(B) elasticized polyphenols having a molecular weight of over 350 with addition to the epoxide groups and further reaction of the reaction product of (A) and (B) with
(C) primary and/or secondary amines or ammonium salts to obtain the required water-dispersibility.

17 Claims, No Drawings

WATER-DISPERSIBLE BINDERS FOR CATIONIC ELECTRODEPOSITABLE PAINTS, AND METHOD FOR THEIR PRODUCTION

The invention relates to water-dispersible binders for cationic electro-dip paints with a base of modified epoxy resins.

Cationic water-dispersible synthetic resins as binders for electro-dip paints are known. Thus, for example, DE-OS No. 2,701,002 describes such a resin, which is a reaction product of a polyepoxy having a molecular weight of at least 350, a secondary amine, and an organic polyol with at least two alcoholic primary hydroxyl groups. The resins are formed by chain extension of high molecular weight polyepoxies with at least two epoxy groups per molecule. The chain extension is achieved with an organic polyol, and the water-dispersibility is obtained by addition of a secondary amine. In DE-OS No. 2,701,002 it is pointed out that the secondary hydroxyl groups contained in any epoxy resin of relatively high molecular weight can, in case of chain extension, enter into competition with the hydroxyl groups of the polyol and may thus cause an undefined molecule structure. In an extreme case, jelling of the reaction batch may occur.

It has now been found, surprisingly, that products with clearly improved properties are obtained if the binder used is not chain-extended with an aliphatic polyol, but if polyphenols are employed to this end.

It is the merit of the present invention, therefore, to have indicated a way to ensure an unambiguous molecule structure by an enhanced reactivity and selectivity of the chain-extending reagent.

The object of the invention is, therefore, to specify water-dispersible binders for cationic electro-dip paints, with the use of which improved coatings are obtained by a precisely performed molecule construction. By this precise structure also the elasticity and flow of the coating process are improved.

According to the invention, this problem is solved in binders of the initially named kind by the fact that they are reaction products of
(A) epoxy resins having a molecular weight of at least 350,
(B) an elasticized polyphenol having a molecular weight over 350 with addition to the epoxide groups, and further reaction of the reaction product with
(C) primary and/or secondary amines or ammonium salts, to obtain the required water-dispersibility.

The new cationic synthetic resins of this invention are formed by chain extension of polyepoxies with at least two epoxy groups per molecule. The chain extension is obtained with organic polyphenol, which may be low-molecular or high-molecular and contains at least two, and preferably likewise two, phenolic hydroxyl groups in the molecule. Preferably the chain extension is carried out in the presence of a catalyst.

It has been found that by the chain extension of the polyepoxies the breakdown voltage of the films produced is improved. At the same time the fluidity and flow of the films is improved. In some cases also increased flexibility is observable.

These improvements can be obtained by using the elasticized polyphenols according to the invention. These polyphenols correspond to the following general formula:

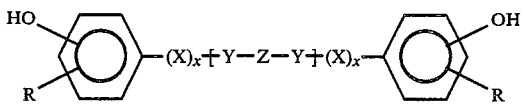

X = alkylene, arylene, alkarylene
  O, O-alkylene, O-arylene, O-alkarylene
  S, S-alkylene, S-arylene, S-alkarylene
  CO, CO-alkylene, CO-arylene, CO-alkarylene
  NH, $NH_x$-alkylene, NH-arylene, NH-alkarylene
x = 0 or 1
Y = X,

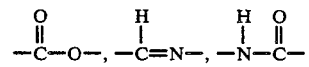

Z = alkylene, alkylene radicals of polyesters, polyethers, polyamides, polycarbonates, polyurethanes
R = H, $CH_3$, alkyl, $-O-CH_3$, $-O-$alkyl, $-NO_2$, $-NR'_2$, $-NR'R''$, $-NHCOR'''$ In particular the radical Z, which preferably is of higher molecular weight, serves for the elastification.

In the present invention, any desired materials which contain two or more epoxy groups in the molecule may be used as polyepoxides (component A). Preferred are compounds with two epoxy groups in the molecule. The polyepoxides have a relatively high molecular weight of at least 350, preferably 350 to 2000. The polyepoxies may be, for example, polyglycidyl ethers of polyphenols, such as bisphenols, e.g. bisphenol A. These polyepoxides can be produced by etherification of a polyphenol with an epihalohydrin in the presence of alkali. Examples of suitable phenol compounds are bis-(4-hydroxyphenyl)-2,2-propane, 4,4'-dihydroxybenzophenone, bis(4-hydroxyphenyl)-1,1-ethane, bis(4-hydroxyphenyl)-1,1-isobutane, 1,5-dihydroxynaphthalene. In some cases it is desirable to obtain polyepoxies of higher molecular weight with aromatic groups. This can be achieved by reacting the aforementioned diglycidyl ethers with a polyphenol such as bisphenol A and then further reacting the resulting product with epichlorhydrin with formation of a polyglycidyl ether. Another suitable class of polyepoxies are polyglycidyl ethers of phenolic novolak resins.

Likewise suitable are similar polyglycidyl ethers of polyvalent alcohols such as ethylene glycol, diethylene glycol, triethylene glycol, 1,2-propylene glycol, 1,4-propylene glycol, 1,5-pentanediol, and bis(4-hydroxycyclohexyl)-2,2-propane.

There may be used also polyglycidyl ethers of polycarboxylic acids.

The polyepoxies preferred in the invention are the polyglycidyl ethers of polyphenols, and among these, the ones with molecular weights of at least 350, preferably in the range of from 350 to 2000.

The polymeric polyepoxies can be reacted with the elasticized polyphenols with chain extension and increase of the molecular weight. The chain lengthening agent acts as a chemical bridge between the low molecular weight polymer chains and combines them to products of higher molecular weight. The reaction occurs between the phenolic hydroxyl groups with opening of the epoxide ring and with formation of ether compounds and of a secondary hydroxyl group.

The chain extension is advantageously achieved by mixing the elasticized polyphenol and reaction at a temperature of about 120° to 180° C. in the presence of a catalyst, such as a tertiary amine. An inert solvent may be present in the reaction. Examples of suitable tertiary amines are benzyldimethyl amine, dimethylcyclohexyl amine, dimethylethanol amine, and triethylamine. Besides amines, other catalysts may be used.

The chain extenders (component B) are elasticized polyphenols which contain at least two, and preferably only two, phenolic hydroxyl groups. Mixtures of polyphenols can also be used.

The polyphenols may have either a low or a high molecular weight and generally have molecular weights of for instance 350 to 3000, preferably about 500 to 1000.

The component B can advantageously be produced for example in the following manner: One mol of a higher-molecular diol, for example of a polyester diol, of a polycaptrolacton diol, of a polyether diol, of a polycarbonate diol or the like, is reacted with two mols of a hydroxyphenyl carboxylic-acid ester. Suitable hydrocarboxylic acids are p-hydroxybenzoic acid, p-hydroxyphenylacetic acid, and 3-(4-hydroxyphenyl-)propionic acid or their esters. If the attaching of the hydroxyphenyl group is carried out by transesterification, it is possible also to carry out a basic transesterification and to use for this purpose the alkali phenolates of the respective hydroxyphenyl carboxylic acid esters. After the end of the reaction, the product must be subjected to an acid process, to obtain the desired polyphenol.

For direct esterification there may be used for example also N-(4-hydroxyphenyl-)glycin.

In another variant, any desired acid polyesters can be reacted with p-hydroxyaniline to the desired polyphenols.

In another advantageous realization, polyether diamines or similar polyamines are reacted, for example, with 4-hydroxy-3-methoxybenzaldehyde to form the polyphenols.

The amine used as component C for the reaction with the epoxide may be primary, secondary or tertiary, secondary amines being especially suitable. Primary and secondary amines can be attached directly to the epoxy ring, tertiary amines only in the form of their ammonium salts or by way of an additional functional group in the molecule. Preferably the amine should be a compound soluble in water. Examples of such amines are mono- and di-alkylamines, such as methylamine, ethylamine, propylamine, butylamine, dimethylamine, diethylamine, dipropylamine, methylbutylamine and the like. Suitable are also alkanolamines, as for example methylethanolamine, diethanolamine and the like. Further, dialkylaminoalkylamines, as for example dimethylaminoethylamine, diethylaminopropylamine and the like, are suitable.

In most cases low-molecular amines are used, but it is possible also to use higher-molecular amines, in particular if it is intended to increase the flexibility of the resin by the incorporation of such amines. Similarly also mixtures of low-molecular and higher-molecular amines can be used to modify the resin properties.

Polyamines with primary and secondary amino groups can be reacted with the epoxide groups in the form of their ketimines. The ketimines are produced from the polyamines in known manner.

The amines may also contain other groups, but these should not disturb the reaction of the amine with the epoxy group and should not lead to jelling of the reaction mixture.

Frequently the reaction of the amine with the epoxy group-containing compound sets in already as these materials are being mixed. But heating to moderately elevated temperatures may possibly be desirable, e.g. to 50° to 150° C., although reactions are possible also at lower and at higher temperatures. To terminate the reaction it is often advantageous to raise the temperature toward the end of the reaction at least slightly for a sufficient time, to ensure a complete reaction.

For the reaction with the epoxy-containing compound there should be used at least a quantity of amine such that the resin assumes a cationic nature, i.e. that under the influence of a voltage in the coating bath it migrates to the cathode if it has been solubilized by addition of an acid. Essentially all epoxy groups of the resin can be reacted with an amine. But it is possible also to leave excess epoxy groups in the resin; upon contact with water they will hydrolyze, forming hydroxyl groups.

Another possibility to achieve the required dispersibility in water is to use as component D Mannich bases, i.e. reaction products of suitable phenols, carrying groups suitable for reaction with an epoxide ring, with formaldehyde and a secondary amine. This, at the same time, makes the binder spontaneously cross-linkable.

Further the amines can be added to the epoxy resins by way of Tscherniac-Einhorn-Michael adducts. These adducts are produced by the following synthesis. First phenols are reacted with methylol(meth)acrylamide to form the Tscherniac-Einhorn intermediate product, whereupon the double bonds are covered with amines. The end products can be reacted with the epoxide groups of the binder by way of the phenol group.

Instead of said amines, or together with them, also the salt of an amine can be used. As amine salt the salt of a tertiary amine can be used. Acids usable in the invention which are suitable for neutralizing the amines include boric acid or other acids with a greater dissociation constant than boric acid, preferably organic acids with a dissociation constant greater than for instance $1 \times 10^{-5}$. The preferred acid is acetic acid. Examples of other acids are formic acid, lactic acid, propionic acid, butyric acid, hydrochloric acid, phosphoric acid, sulfuric acid and carbonic acid.

The amine component of the amine-acid salt is an amine which may be unsubstituted or substituted as in the case of hydroxylamine, but these sustituents should not disturb the reaction of the amine-acid salt with the polyepoxide and should not jell the reaction mixture. Preferred amines are tertiary amines, such as dimethylethanolamine, triethylamine, trimethylamine, triisopropylamine and the like. Examples of other suitable amines are given in U.S. Pat. No. 3,839,252, column 5, line 3, to column 7, line 42.

The amine-acid salt mixture is obtained in known manner by reaction of the amine with the acid. Also amine-acid mixtures may be used, although as a rule they react with formation of the acid salt.

The reaction temperature for the reaction of the amine-acid salts with the polyepoxides can be varied between the lowest temperature at which the reaction proceeds at an appreciable rate, e.g. room temperature or, as a rule, somewhat higher than room temperature, to a maximum temperature between about 10° and 100° C. A solvent is not necessary for the reaction, although frequently it is added in order to be able to control the reaction better. As solvents, aromatic hydrocarbons or monoalkyl ethers of ethylene glycol enter into consideration.

The specific starting materials, quantities and reaction conditions are chosen in accordance with well-known experience in such a way that jelling of the product during the reaction is avoided. Thus, for example, overly aggressive reaction conditions are not applied. Similarly, starting materials with reactive substituents able to react with the epoxy compounds are not used, as they might have an adverse effect on the reaction.

In order to obtain highly stable coatings with the binder according to the invention, it is advantageous to add to the electro-dip paint a crosslinking agent which at elevated temperatures causes the cross-linking of the binder, or to modify the binder so that it contains reactive groups which at elevated temperatures cause spontaneous cross-linkage. A spontaneously crosslinking system can advantageously be obtained in that the binder . . . (is reacted) with a partially blocked polyisocyanate which on the average possesses one free isocyanate group per molecule and whose blocked isocyanate groups are stable at room temperature and are unblocked at elevated temperatures and react with the hydroxyl groups formed by the opening of the epoxide rings with urethane formation. The binder may be spontaneously cross-linkable by the use of the previously described Mannich bases as component D.

Frequently employed methods for the cross-linking of binders are published e.g. in the following disclosures: DE-OS No. 2,057,799, European patent application Nos. 12,463 and 4090, and DE-OS No. 2,752,256.

If crosslinking agents are used, they represent as a rule about 5 to about 60 percent by weight of the binder.

Preferred are about 20 to about 40 percent by weight of the binder.

Examples of suitable aminoplast crosslinking agents are the hexamethyl ether of hexamethylol melamine, the triethyl-trimethyl ether of hexamethylol melamine, the hexabutyl ether of hexamethylol melamine and the hexamethyl ether of hexamethylol melamine and polymeric butylated melamine formaldehyde resins.

Urea-aldehyde crosslinking agents can be produced in known manner by reacting urea and an aldehyde to the resol stage and alkylizing the reaction product with an alcohol under acid conditions, an alkylated urea-aldehyde resin being obtained. An example of a suitable crosslinking agent with a base of an urea-aldehyde resin is a butylated urea-formaldehyde resin.

As crosslinking agents also blocked polyisocyanates can be employed. For the invention any desired polyisocyanates may be used wherein the isocyanate groups have been reacted with a compound so that the formed blocked polyisocyanate is stable to hydroxyl groups at room temperature, but reacts at elevated temperatures, as a rule in the range from about 90° to about 300° C. For the production of the blocked polyisocyanates any desired organic polyisocyanates suitable for cross-linking may be used.

The organic polyisocyanates entering into consideration as crosslinking agents in the invention may also be prepolymers, derived, for example, from a polyol, including a polyether polyol or a polyester polyol.

For the blocking of the polyisocyanates any desired suitable aliphatic, cycloaliphatic or aromatic alkyl monoalcohols may be used. Other suitable blocking agents are hydroxylamines or secondary amines.

The blocked polyisocyanates are produced by reacting a sufficient quantity of the blocking agent with the organic polyisocyanate, so that there are no longer any free isocyanate groups. The reaction between the organic polyisocyanate and the blocking agent is exothermic. For this reason the polyisocyanate and the blocking agent are mixed preferably at a temperature not higher than 80° C., in particular lower than 50° C., to counteract the exothermic effect.

The invention relates also to a method for the production of a binder for cationic electro-dip paints by reaction of (A) epoxy resins having a molecular weight of at least 350 with (B) an elasticized polyphenol having a molecular weight over 350 with addition to the epoxide groups and further reaction of the reaction product with (C) primary and/or secondary amines or ammonium salts to obtain the required dispersibility in water, characterized in that there is employed as component B an elasticized polyphenol which corresponds to the above-explained general formula

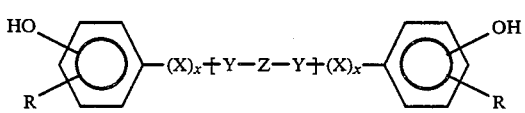

The invention further relates to the use of the binders for electro-immersion baths.

To obtain highly stable coatings with the use of the binders according to the invention, it is advantageous to add to the electro-dip paint a crosslinking agent which at elevated temperatures causes the cross-linking of the binder, or to modify the binder so that it contains reactive groups which at elevated temperatures cause spontaneous cross-linkage. A spontaneously cross-linking system can advantageously be obtained in that the binder . . . (is reacted) with a partially blocked polyisocyanate which on the average possesses one free isocyanate group per molecule and whose blocked isocyanate groups are stable at room temperature and are unblocked at elevated temperatures and react with the hydroxyl groups formed by the opening of the epoxide rings with urethane formation.

To impart to the synthetic resin a sufficient cationic nature for electro-deposition, generally the neutralizable nitrogen per gram of total resin solids is preferably kept between 0.3 and 3 milli-equivalents.

Aqueous dispersions of the resin products according to the invention are very suitable as coating compositions, in particular for the production of coatings by electrodeposition. However, the coating compositions may also be applied on the substrates by conventional methods. For the dispersion in water the resin-like products are neutralized, to form cationic groups, e.g. salts of tertiary amines, and, in the case of hydrolyzed ketimine-containing resins, salts of primary amines.

The neutralization of the products is achieved by reaction of a part or all of the amino groups by a water-soluble acid, e.g. formic acid, acetic acid or phosphoric acid. The degree of neutralization depends on the particular resin, and it is generally sufficient to add only enough acid for the resin to be dispersible in water.

The concentration of the resin-like products in the aqueous medium depends on the process parameters to be used and is, as a rule, not critical. Normally water constitutes the bulk of the aqueous dispersion. The aqueous dispersion may contain e.g. about 5 to about 50 percent by weight of resin solids.

Besides water, the aqueous medium may contain a coalescing solvent. By the concomitant use of a coalescing solvent, in many cases a better appearance of the film is obtained. Such solvents include hydrocarbons, alcohols, esters, ethers and ketones. The preferred coalescing solvents are mono-alcohols, glycols and polyoles and also ketones and ether alcohols. Specific coalescing solvents are isopropanol, butanol, isophorone, 4-methoxy-methylpentanone-2, ethylene and propylene glycol, monoethyl, monobutyl and monohexyl ether of ethylene glycol, and 2-ethylhexanol. The quantity of the coalescing solvent is not critical and in general one uses between about 0.1 and 40 wt.%, preferably about 0.5 to 25 wt.%, referred to the total weight of the aqueous medium.

In most cases the aqueous dispersion contains also pigments and other conventional additives, such as surface-active agents. The usual pigments may be used, such as iron oxides, lead oxides, strontium chromate, carbon black, coal dust, titanium dioxide, talc, barium sulfate, and color pigments such as cadmium yellow, cadmium red, chrome yellow and the like. The pigment content of the dispersion is expressed, as a rule, as a ratio of pigment to resin. In the invention the pigment-to-resin ratio is, as a rule, in the range of from 0.01 to 5:1. Other common additives may be present in the dispersion as a rule in quantities of approximately 0.01 to 3 wt.%, referred to the total weight of resin solids. p In the electrodeposition of the synthetic resins according to the invention, the resins in aqueous dispersion are brought into contact with an electrically conducting anode and an electrically conducting cathode, the cathode being the surface to be coated. During contact with the aqueous dispersion, an adhering film of the coating composition is deposited on the cathode upon application of a voltage between the electrodes.

The conditions in which the electrodeposition takes place are generally similar to those used for the electrodeposition of other coating compositions. Normally the voltage is between about 50 and 500 volts.

During the electrodeposition the dispersion advantageously has a pH between 3 and about 9.

The electrodeposition of the synthetic resins according to the invention may be on any desired conductive substrates, in particular metals such as steel, aluminum, copper or magnesium. After the electrodeposition the coating can be hardened by heating to elevated temperatures. As a rule, temperatures of from 90° to 200° C. and periods of from 1 to 30 minutes are suitable.

To ensure rapid and complete hardening, it is sometimes advantageous to have a catalyst in the coating composition. The quantity of the catalyst used should be sufficient to accelerate the hardening of the deposited film. Typical quantities are quantities of about 0.05 percent to about 4 percent, referred to the weight of the total resin solids. As a rule, about 2 wt.% of such a catalyst are used. However, if the hardening temperatures are high enough, the catalyst can be dispensed with.

The invention, therefore, relates also to a method for the electrophoretic coating of an electrically conducting substrate connected as a cathode from an aqueous bath with a base of cationic binders at least partially neutralized with acids, the binders having been made spontaneously crosslinkable by reaction, or the bath containing an additional crosslinking agents, characterized in that the binders (are) reaction products of (A) epoxy resins having a molecular weight of at least 350

(B) an elasticized polyphenol having a molecular weight of over 350 with addition to the epoxide groups and further reaction of the reaction product with (C) primary and/or secondary amines or ammonium salts, to obtain the required water-dispersibility characterized in that as component (B) an elasticized polyphenol is employed which corresponds to the above-explained formula

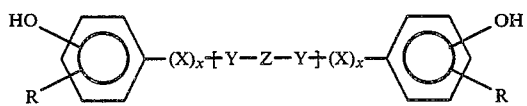

PREPARATION OF A CROSSLINKING AGENT I

A reactor, equipped with a heating device, a cooler, an agitator, a thermometer, an outlet line leading to a washing device, and a system for introducing nitrogen, is charged with 12,280 parts toluylene diisocyanate (mixture of about 80% 2,4-toluylene diisocyanate and about 20% 2,6-toluylene diisocyanate). Nitrogen is introduced and the cooler is turned on. In the course of 5 hours 5550.5 parts 2-ethylhexanol are added gradually, the temperature rising gradually to 50° C. While the temperature of 50° C. is maintained, an additional 3649.5 parts 2-ethylhexanol are added in the course of 4 hours. The reaction mixture is maintained for 75 minutes at 50° C., then the cooler is turned off and 3.6 parts dibutyl tin dilaurate are added. The heating device is connected and the reaction mixture is heated to 65° C. in the course of 45 minutes. In the course of two hours and 50 minutes 3184 parts 1,1,1-trimethylol propane are added, the temperature rising from 65° to 120° C. The reaction mixture is maintained at this temperature for 90 minutes, then 10,560 parts 2-ethoxyethanol are added. The resulting product is a solution of a polyurethane crosslinking agent.

PREPARATION OF A CROSSLINKING AGENT II 2340 g glycidyl ester of 2-methyl-2-ethyl heptanic acid are heated with 2073 g trimellitic acid anhydride to 130° C. in a reaction vessel. At that point the highly exothermic reaction starts up. By external cooling the reaction is maintained at 150° C. until an acid number of 183 is reached. Then the temperature is reduced to 90° C. and 1450 g MIBK* are added. Thereafter 835 g propylene oxide are slowly added in drops. At acid number 2 the reaction is stopped. The solid content of the resin solution is adjusted with additional MIBK* to 70%.

*MIBK=methyl isobutyl ketone

PREPARATION OF AN ELASTICIZED POLYPHENOL I

In a suitable reaction vessel with shield gas introduction, 500 g of a polycaprolacton diol (OH number 210.9) and 286 g p-hydroxybenzoic acid methyl ester are charged. The mixture is heated to 140° C. and homogenized. Then 3.9 g tin octoate are added, heating to 180° C. At this point the methanolysis begins. After completed splitting off, agitation is continued for another hour at 180° C., whereupon the product is cooled.

PREPARATION OF AN ELASTICIZED POLYPHENOL II

The procedure is as in the preparation of the polyphenol I, but using 695 g of a polytetrahydrofurane diol instead of the polycaprolacton diol (OH number 152).

PREPARATION OF AN ELASTICIZED POLYPHENOL III

In a suitable reactor 550 g adipic acid, 262 g neopentyl glycol, 49 g xylene and 0.8 g dibutyl tin oxide are received and heated. At 132° C. the splitting off of water begins. The temperature is slowly raised to 186° C. and maintained until the corresponding quantity of water is eliminated (90 g). This is followed by cooling to 100° C. and addition of 274 g p-aminophenol. Then the temperature is increased again. At 162° C. water again splits off. The temperature is slowly raised to 185° C. and maintained constant until 45 g water have split off. Thereafter the xylene is distilled. To introduce the elasticized binder into the resins, the polyphenol is preheated to 100° C.

PREPARATION OF A BINDER I

In a suitable reactor 918 g of a commercial epoxy resin with a base of bisphenol A (epoxy equivalent weight 188), 278 g of polyphenol I and 79 g xylene are received and heated. At 141° C. 2.2 ml dimethylbenzylamine are added. By exothermic reaction the temperature continues to increase (165° C.). The temperature is maintained until an epoxy equivalent weight of 490 is reached. Then 332 g bisphenol A are added and another 2.2 ml dimethylbenzylamine are supplied. The addition reaction is carried out at 160° C. until an epoxide equivalent weight of 1240 is reached. Then 1178 g of the crosslinking agent I, 100 g of a ketimine and 72 g methylethanolamine are added. The reaction is continued for one hour at 115° C., then adding 169 g hexyl glycol and mixing under for 15 minutes. Meanwhile one prepares a dispersion bath from 1401 g deionized water, 27.4 g glacial acetic acid and 30.7 g of an antifoam solution. In it 2500 g of the above-described resin solution are dispersed. After one hour, 1702 g deionized water are added, while mixing, over 30 minutes. Thereafter the dispersion is filtered. It has the following characteristic values:

| | |
|---|---|
| Solids, 30 min., 150° C. | 33.5% |
| pH value | 7.1 |
| MEQ acid | 0.2841 |
| MEQ base | 0.6040 |

PREPARATION OF A BINDER II

The procedure as for binder I is followed, but using the elasticized polyphenol II and crosslinking agent II.

| | |
|---|---|
| Epoxy resin (EEW 188) | 813 parts |
| Polyphenol II | 485 parts |
| Xylene | 70 parts |
| Dimethylbenzylamine | 1.7 parts |
| Bisphenol A | 247 parts |
| Dimethylbenzylamine | 3.5 parts |
| Crosslinking agent II | 1178 parts |
| Ketimine | 88 parts |
| Methylethanolamine | 64 parts |
| Hexyl glycol | 137 parts |
| Resin solution | 2500 parts |
| Deionized water | 1452 parts |
| Glacial acetic acid | 27 parts |
| Emulsifier solution | 31 parts |
| Deionized water | 1723 parts |

After its production the dispersion is heated to 60° C. under vacuum. Thereby 305 g organic phase are drawn off. After cooling, the dispersion is filtered. It has the following characteristic values:

| | | |
|---|---|---|
| Solids 30 min., 150° C. | 37.4% | |
| pH value | 6.9 | |
| MEQ acid | 0.3045 | |
| MEQ base | 0.5821 | |

PREPARATION OF A BINDER III

The procedure as for binder I is followed, but using the elasticized polyphenol II.

| | | |
|---|---|---|
| Epoxy resin (EEW 188) | 855 | parts |
| Polyphenol III | 425 | parts |
| Xylene | 74 | parts |
| Dimethylbenzylamine | 1.8 | parts |
| Bisphenol A | 259 | parts |
| Dimethylbenzylamine | 3.6 | parts |
| Crosslinking agent I | 1178 | parts |
| Ketimine | 93 | parts |
| Methylethanolamine | 67 | parts |
| Hexyl glycol | 138 | parts |
| Resin solution | 2500 | parts |
| Deionized water | 1444 | parts |
| Glacial acetic acid | 28 | parts |
| Emulsifier solution | 1719 | parts |

Characteristic values of dispersion III

| | | |
|---|---|---|
| Solids 30 min., 150° C. | 35.6% | |
| pH value | 7.2 | |
| MEQ acid | 0.2989 | |
| MEQ base | 0.6103 | |

PREPARATION OF A GRAY PIGMENT PASTE

To 953 parts of a bisphenol A-based commercial epoxy resin having an epoxide equivalent weight of 8% add 800 parts butyl glycol. The mixture is heated to 80° C. Then introduce into the resin solution 221 parts of a reaction product of 101 parts diethanolamine and 120 parts 80% aqueous lactic acid. The reaction is carried out at 80° C. until the acid number has dropped below 1.

To 1800 parts of this product add 2447 parts deionized water and mix with 2460 parts $TiO_2$, 590 parts of an aluminum silicate-based extender, 135 parts lead silicate and 37 parts carbon black. In a grinding unit comminute this mixture to a Hegmann fineness of 5 to 7. Then add 1255 parts deionized water to obtain the desired consistency of the paste. This gray paste is very stable in storage.

PREPARATION OF THE ELECTRO-IMMERSION BATHS AND SEPARATION OF LACQUER FILMS 2000 parts by weight of the above described binder dispersions are mixed with 775 parts by weight of the gray pigment paste. With deionized water, the solids of the bath are adjusted to 20% (150° C., 30 min.). The bath is then aged for 3 days while being agitated. The deposition of the lacquer films takes place in 2 minutes on zinc-phosphate-treated sheetmetal. The bath temperature is 27° C. The deposited films are baked for 20 minutes at 180° C.

| | Dispersion I | Dispersion II | Dispersion III |
|---|---|---|---|
| Deposition voltage V | 310 | 300 | 350 |
| Film thickness /um | 19 | 17 | 21 |
| Grid section* | 0 | 0 | 0 |
| Adhesion | very good | good | very good |
| Flow° | 1 | 1.5 | 1 |
| Erichsen cupping index mm | 8.3 | 1.5 | 8.9 |
| Cross-linkage** | o.k. | o.k. | o.k. |

*0 best value, 5 worst value
**20 double strokes MIBK

We claim:
1. A water-dispersible binder for a cationic electro-dip paint with a base of a modified epoxy resin, comprising
   (A) a polyepoxy resin having a molecular weight of at least 350 which is reacted with
   (B) an elasticized polyphenol having a molecular weight over 350 and having the general formula

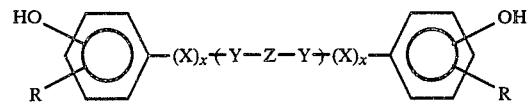

to produce an intermediate product wherein:
X is alkylene, arylene, alkarylene,
  O, O-alkylene, O-arylene, O-alkarylene,
  S, S-alkylene, S-arylene, S-alkarylene,
  —CO—, CO-alkylene, CO-arylene, CO-alkarylene,
  —$SO_2$—, $SO_2$-alkylene, $SO_2$-arylene, $SO_2$-alkarylene,
  —NH—, $NH_x$-alkylene, NH-arylene or NH-alkarylene;
x is 0 or 1;
Y is X,

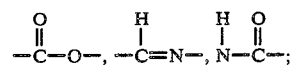

Z is alkylene, polyester, polyether, polyamide, polycarbonate, or polyurethane;
R is H, $CH_3$, alkyl, —O—$CH_3$, —O—alkyl, —$NO_2$, —$NR'_2$, —NR'R", or —NHCOR'''; and provided that
  when X is O, S or NH then Y is other than O, O-alkylene, O-arylene, O-alkarylene, S, S-alkylene, S-arylene, S-alkarylene, NH, NH-alkylene, NH-arylene, NH-alkarylene or —NHCO—;
  when X is CO or $SO_2$ then Y is other than CO, CO-alkylene, CO-arylene, CO-alkarylene, $SO_2$, $SO_2$-alkylene, $SO_2$-arylene, $SO_2$-arylene, $SO_2$-alkarylene or —$CO_2$—; and
further reaction of the intermediate product of (A) and (B) with
(C) a primary and/or secondary amine and/or ammonium salt to produce the binder having the required water-dispersibility.
2. A binder according to claim 1, wherein component A is a polyepoxy resin which is a glycidyl ether of Bisphenol A.

3. A binder according to claim 1, wherein the component A is a polyglycidyl ether.

4. A binder according to claim 1 2, or 3 wherein the proportion of component (B) is 10-50 wt.%, based on the total amount of binder.

5. A binder according to claim 1, 2 or 3, further comprising a product produced by reaction of the binder and a partially blocked polyisocyanate which possesses on the average one free isocyanate group per molecule and whose blocked isocyanate groups are stable at room temperature.

6. A process for the production of a binder for a cationic electro-dip paint with a base of a reaction product of a polyepoxy resin and a primary and/or secondary amine and/or an ammonium salt, which optionally contains a crosslinking agent, a pigment, a leveling agent and other common aids, comprising reacting (A) said polyepoxy resin having a molecular weight of at least 350 with (B) an elasticized polyphenol having a molecular weight over 350 and having the general formula

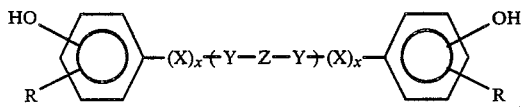

to produce an intermediate product wherein:
X is alkylene, arylene, alkarylene,
O, O-alkylene, O-arylene, O-alkarylene,
S, S-alkylene, S-arylene, S-alkarylene,
—CO—, CO-alkylene, CO-arylene, CO-alkarylene,
—SO₂—, SO₂-alkylene, SO₂-arylene, SO₂-alkarylene,
—NH—, NH$_x$-alkylene, NH-arylene or NH-alkarylene;
x is 0 or 1;
Y is X,

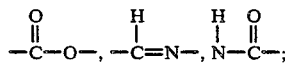

Z is alkylene, polyester, polyether, polyamide, polycarbonate, or polyurethane;
R is H, CH₃, alkyl, —O—CH₃, —O-alkyl, —NO₂, —NR'₂, —NR'R'', or —NHCOR'''; and provided that
when X is O, S or NH then Y is other than O, O-alkylene, O-arylene, O-alkarylene, S, S-alkylene, S-arylene, S-alkarylene, NH, NH-alkylene, NH-arylene, NH-alkarylene or —NHCO—;
when X is CO or SO₂ then Y is other than CO, CO-alkylene, CO-arylene CO-alkarylene, SO₂, SO₂-alkylene, SO₂-arylene, SO₂-arylene, SO₂-alkarylene or —CO₂—; and
reacting the intermediate product of (A) and (B) with
(C) a primary and/or secondary binder amine and/or an ammonium salt to to produce the binder having the required water-dispersibility.

7. A process according to claim 6, wherein the component (A) polyepoxy resin is a glycidyl ether of Bisphenol A.

8. A process according to claim 6, wherein the polyepoxy resin is a polyglycidyl ether.

9. A process according to claim 6, 7 or 8, wherein the proportion of component (B) is 10-50 wt.%, based on the total amount of binder.

10. A process according to claim 6, 7 or 8 wherein the binder produced by reaction of components A, B and C is reacted with a partially blocked polyisocyanate which possesses on the average one free isocyanate group per molecule and whose blocked isocyanate groups are stable at room temperature.

11. An electro-immersion bath comprising an aqueous dispersion of the binder set forth in claim 1.

12. An electro-immersion bath comprising an aqueous dispersion of the binder set forth in claim 3.

13. An electro-immersion bath comprising aqueous dispersion of the binder set forth in claim 4.

14. A binder according to claim 1, 2 or 3 wherein the elasticized polyphenol is the reaction product of about one mole of a polyester diol, polycaprolactone diol, a polyether diol or a polycarbonate diol and about two moles of hydroxyphenyl carboxylic acid, the ester thereof, a substituted hydroxyphenyl carboxylic acid or the ester thereof.

15. A binder according to claim 14 wherein the hydroxyphenyl carboxylic acid or ester thereof is selected from the group consisting of p-hydroxybenzoic acid or ester, p-hydroxylphenyl acetic acid or ester, 3-(4-hydroxyphenyl)-propionic acid or ester and N-(4-hydroxyphenyl)-glycine.

16. A binder according to claim 1, 2 or 3 wherein the elasticized polyphenol is the reaction product of a polyamine and 4-hydroxy-3-methoxybenzaldehyde.

17. A binder according to claim 16 wherein the polyamine is a polyether diamine.

* * * * *